Nov. 7, 1944.   J. C. HAGGART, JR   2,362,131
LUMINOUS BATON
Filed Dec. 11, 1942   3 Sheets-Sheet 1
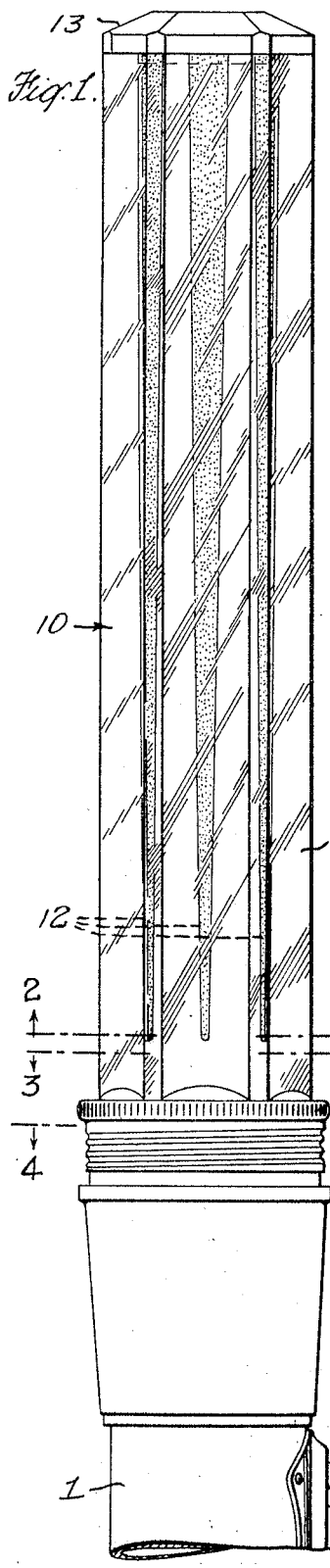
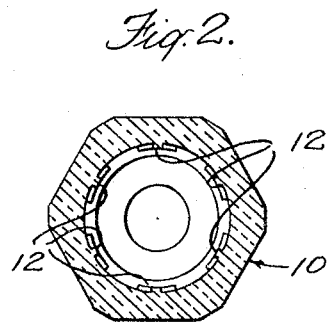
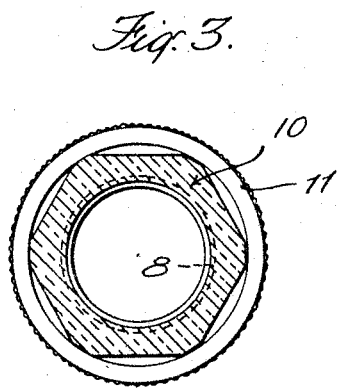
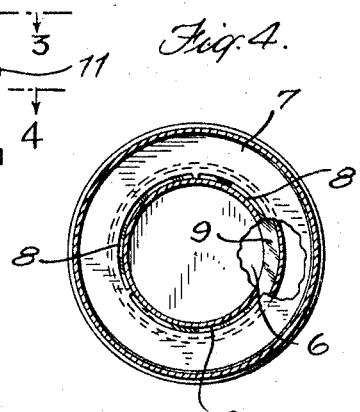
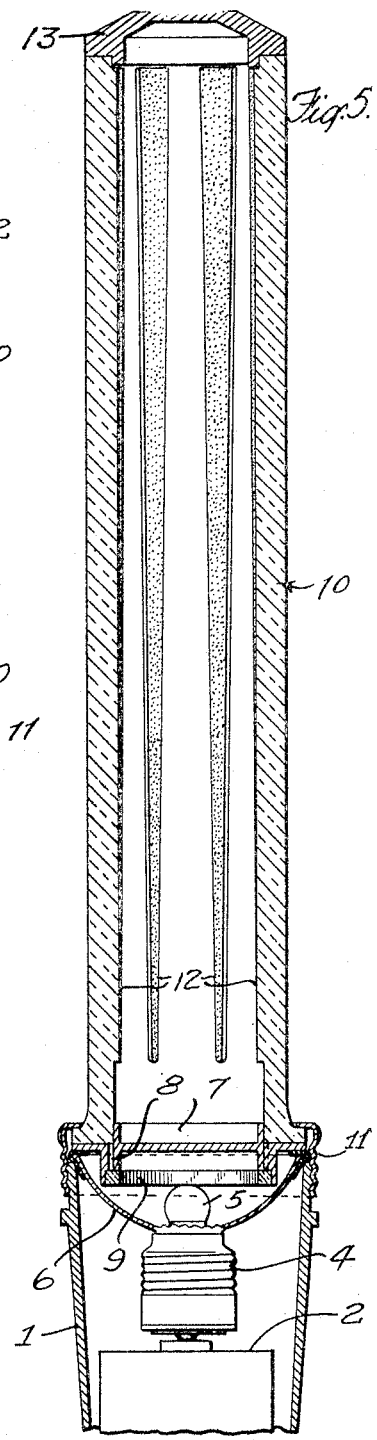
INVENTOR
JOHN C. HAGGART, JR.
BY
ATTORNEY Nov. 7, 1944.  J. C. HAGGART, JR  2,362,131
LUMINOUS BATON
Filed Dec. 11, 1942  3 Sheets-Sheet 2
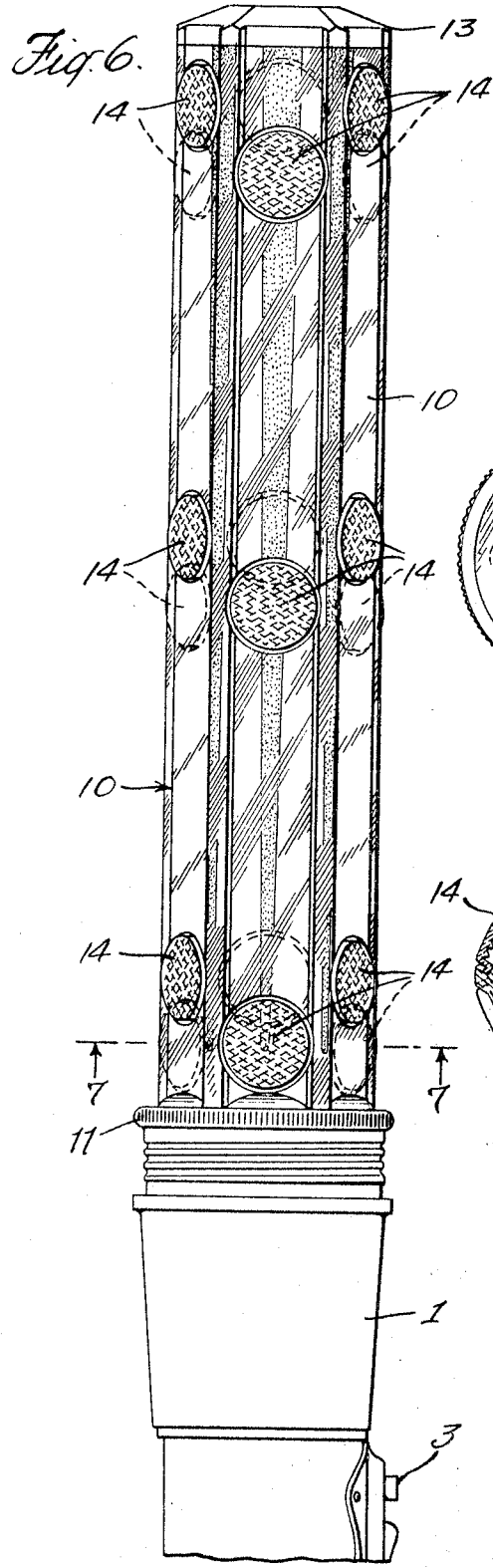
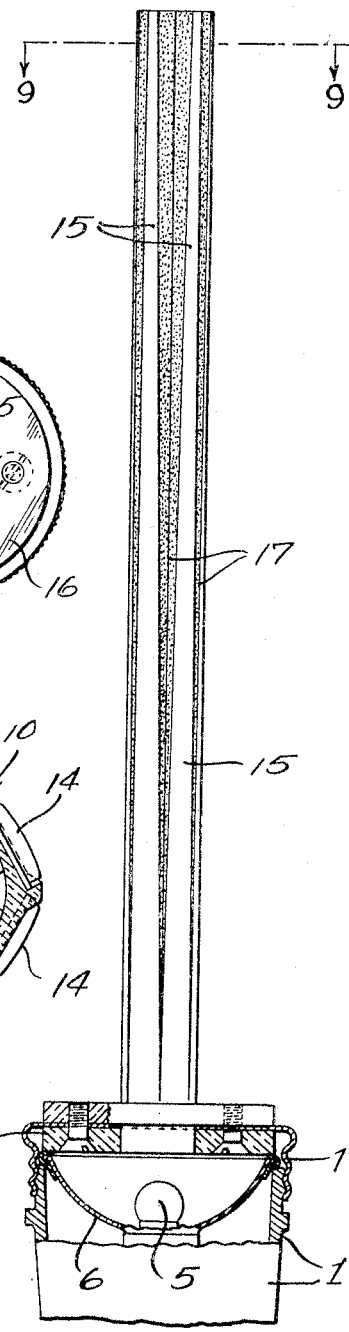
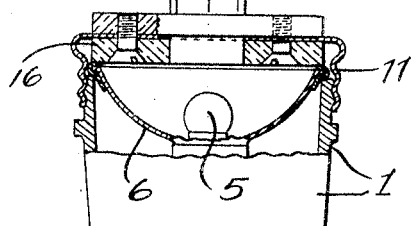
INVENTOR
JOHN C. HAGGART, JR.
BY
ATTORNEY Nov. 7, 1944.  J. C. HAGGART, JR  2,362,131
LUMINOUS BATON
Filed Dec. 11, 1942  3 Sheets-Sheet 3
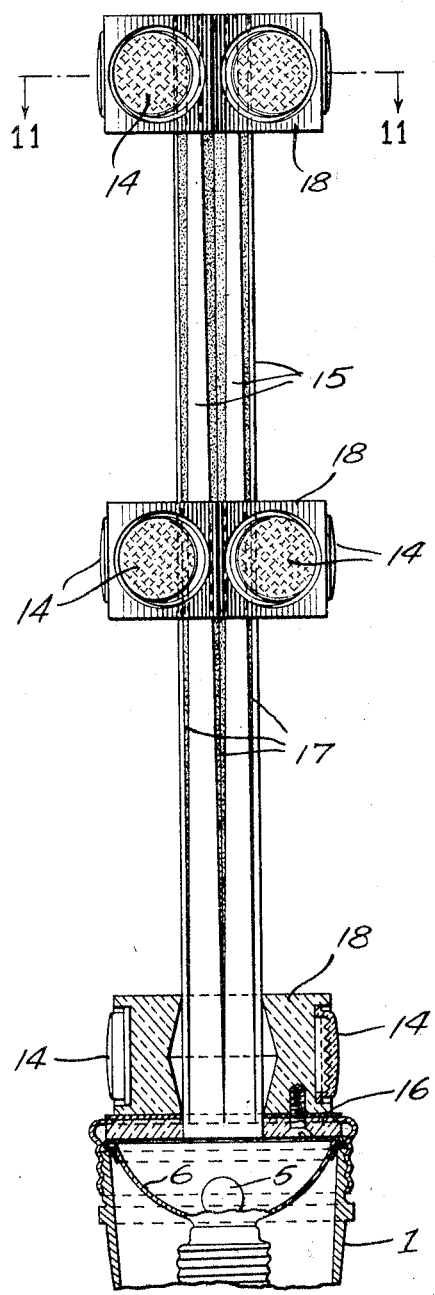
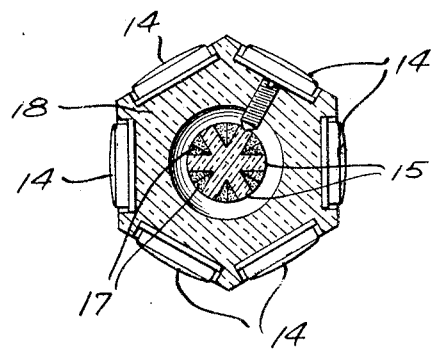
INVENTOR
JOHN C. HAGGART, JR
BY
ATTORNEY Patented Nov. 7, 1944

2,362,131

UNITED STATES PATENT OFFICE 2,362,131

LUMINOUS BATON

John C. Haggart, Jr., Martinsville, N. J., assignor to Signal Service Corporation, a corporation of Delaware Application December 11, 1942, Serial No. 468,607

5 Claims. (Cl. 177—329)

This invention has particular application to the problem of visual signaling under conditions where it is required that visibility be for a limited distance. An example of this is the directing of military traffic at night in a hostile region. Luminous batons are used for this purpose and it is necessary that the baton be visible and its movements discernible for a minimum distance of a few hundred feet, say 400 feet, but that the threshold of visibility of the luminous object shall be at a distance not exceeding one to two thousand feet.

To be useful for signaling it is necessary that the baton shall retain its dimensional appearance throughout the range of use, that is, that it shall have length and not appear like a source of light of indeterminate shape.

In carrying out the invention use is made of the property of certain materials to conduct light by internal reflection, the light being admitted internally at one end and the surface being highly specular and the incident angle being such that total reflection occurs. Such devices will function for transmitting light in other than a straight line. While a certain amount of light is lost due to imperfection of surface and absorption in the material, it is well known that they can be highly efficient.

While some natural materials including quartz have been used for this purpose, certain commercial plastics especially acrylic resins, of which the plastic known under the trade name of "Lucite" is an example, are superior for the purpose. "Lucite" has substantially the optical properties of crown glass and is less frangible. Another advantage of "Lucite" is the fact that it will assume the highly polished surface of a mold. Therefore this disclosure will assume "Lucite" as the material for the luminous rod of the baton, though it will be understood that this is not exclusive.

It is contemplated that a more or less conventional form of flash light will constitute the handle and the source of light for the baton, a "Lucite" rod being secured to the flash light as an extension thereof, there being a light opening opposite the end of the rod.

In order to make the rod luminous throughout its length, the specular surface is interrupted by spaced longitudinal strips that have a diffusing or mat surface. These strips are tapered from the light source end outwardly so as to provide substantially uniform illumination from end to end. These mat strips provide the luminous area, being in effect secondary sources of light, and the threshold of visibility depends both upon the amount of light that is admitted into the end of the rod, and the aggregate mat area provided by the tapered strips. The light opening and the area of the strips are so controlled and designed as to give the desired results.

The invention also contemplates particular features of construction which have proven to be advantageous and useful. These will appear from the following description of the illustrated embodiments of the invention.

Fig. 1 is an elevation of one embodiment, part of the handle being broken away.

Fig. 2 is a section of the same on the line 2—2 of Fig. 1.

Fig. 3 is a section on the line 3—3 of Fig. 1.

Fig. 4 is a section on the line 4—4 of Fig. 1.

Fig. 5 is a central longitudinal section of the same.

Fig. 6 is a view similar to Fig. 1 showing a modified embodiment of the invention.

Fig. 7 is a section on the line 7—7 of Fig. 6.

Fig. 8 is an elevation partly in section of a modified form of the invention, part of the handle being broken away.

Fig. 9 is a section on the line 9—9 of Fig. 8.

Fig. 10 is a view similar to Fig. 8 showing a modification.

Fig. 11 is a section on the line 11—11 of Fig. 10.

In the form shown in Figs. 1 to 5, inclusive, the "Lucite" rod is hollow and its outside contour is hexagonal in cross section, the inside wall being cylindrical.

The handle 1 is a flash light containing batteries 2 (one being shown), and having a switch 3, a socket 4, a light bulb 5 and a reflector 6. An opaque shield 7 which closes the end of the case has an annular light emitting slot 8 formed axially in a rearward flange, as shown. A colored transparent ring 9 at the entrance to the slot serves as a light filter if desired. The flanged end of the hollow "Lucite" rod 10 is seated upon the shield 7 and fits over a positioning flange on the front face of the shield that forms a continuation of the inner wall of the slot 8. The slot therefore opposes the inner margin of the rod. A cap 11 is flanged over the rod flange and screws on to the end of the flash light case and thus secures the rod to the handle.

The length of the rod 10 is several inches, long enough to have the appearance when illuminated of a rod at a distance of three or four hundred feet. The thickness of the wall is such that the angle of incidence of the light with the surfaces will be within the critical angle of total reflection. Except for the imperfections of the surface the light will therefore be transmitted axially along the tubular wall.

The rod 10 is molded of "Lucite" or other suitable material in a mold the walls of which are optically smooth, and the contact surfaces of the "Lucite" assumes and retains this optical smoothness. The outer surface may be polygonal and is shown as hexagonal. The inner surface is shown as having six raised strips 12 running longitudinally and disposed one opposite each of the six external sides.

The surfaces of the strips 12 are roughened by buffing or otherwise so as to make them mat or diffusing in character. Ideally these are the only surfaces through which light escapes laterally. From them light is reflected and refracted in all directions. These strips therefore become visible and at a distance the eye resolves them into the appearance of an integrated luminous rod.

These mat surface strips are shaped to compensate for the loss of light along the rod. The light entering through the slot 8 is progressively lost as it proceeds toward the outer end. Some of this loss is at the specular surfaces due to imperfections in the surfaces. Some of the light is absorbed in the material. The greatest loss is at the mat surfaces of the strips 12. Therefore to make the candle power of a strip as a secondary source of light uniform throughout its length, the area must increase as the average intensity of foot-candles of illumination decreases due to progressive loss of light. The strips 12 are therefore tapered outwardly, the desideratum being to effect exact compensation for the loss of light.

At a distance, therefore, the rod appears equally bright throughout its length and maintains its dimensional appearance of length. The size of the slot 8 is precisely determined for a bulb of given candle power to produce the threshold of visibility at a predetermined distance.

To prevent the light from escaping at the end, the rod may have an opaque cap 13. Preferably this will be of opaque "Lucite" of the same color as that of the rod and with a polished flange surface where it contacts the end of the rod. Thus it serves as a reflector and returns the light which would otherwise be lost.

It is desirable for general utility that the baton be usable for directing traffic when conditions are such that the vehicles can use their head lights. For this purpose, as shown in Figs. 6 and 7, the baton may be provided with a succession of circumferential series of auto-collimating reflectors. These reflectors should be transparent to light emanating from the baton but should be adapted to return external light falling upon them back toward the source.

Three series of such reflectors are shown in Fig. 6. They are discs 14 of "Lucite" with reflective rear surfaces formed of trihedral angles, being of the type known generally as triple reflectors. Light from the rear passes through them, and light incident from the front is reflected. Therefore they do not detract materially from the visibility of the baton when self illuminated, and they become visible by reflected light. There are six discs 14, one for each wall, in each series, and the three series are sufficiently spaced to give the appearance of length to the baton at a distance. The discs are seated in circular cavities or sockets formed in the walls, and the corners are raised above the general level of the sides so that the discs are flush with the baton surface at the corners though extending above the surface between the corners. The discs of each series are staggered so that three are in a plane slightly offset from that of the other three. In this way the partition walls between successive discs are not unduly thinned.

An embodiment of the invention in the form of a solid instead of a hollow "Lucite" rod is shown in Figs. 8 to 11, inclusive. In this form a solid cylindrical rod 15 of "Lucite" is secured in an adapter 16 on the end of a flash light. The amount of light admitted and hence the threshold of visibility is determined by the size of the opening in the adapter. In the form shown it is of the size of the rod.

In this case the illumination of the rod throughout its length is effected by a series of six longitudinal V-shape grooves 17 progressing in depth from the light source end outwardly. These grooves have mat surfaces and the surface area is designed to change inversely with the amount of light falling upon them, that is, inversely with the average foot-candle intensity. If desired an opaque cap (not shown) may be placed on the end of the rod.

To accommodate the reflector discs in such construction, hexagonal collars 18 of transparent "Lucite" are secured at spaced intervals upon the rod, and a reflector disc is seated in a socket in each face of the collars. The two upper collars are attached by radial set screws, as shown in Fig. 11, and the lower collar is attached to the adapter 16 by axial screws. The inner diameter of the collars 18 is shown as tapering from a maximum at the middle to the rod size at each face.

It will be understood that the embodiments herein shown and described are intended merely for the purpose of illustration and that the invention may be variously otherwise embodied without departing from the scope of the invention as defined in the following claims.

I claim:

1. A baton or the like comprising a handle having an annular, light emitting slot in one end, a source of light in the handle, and a hollow rod of a translucent material having the property of conducting light in an axial direction by internal reflection secured to the handle with one of its annular ends opposing the light emitting slot, the outer surface of the rod being specular and the inner surface having alternate specular and mat longitudinal zones with the mat zones increasing progressively in width from the light source end.

2. A baton or the like comprising a handle having an annular light emitting slot in one end, a source of light in the handle, and a hollow rod of a translucent material having the property of conducting light in an axial direction by internal reflection and having a polygonal external cross section and secured to the handle with one of its annular ends opposing the light emitting slot, the outer polygonal surface being specular and the inner surface having a tapered longitudinal mat surfaced strip opposite each external side and being specular between the mat strips, the taper being from the light source end outward.

3. A baton or the like comprising a handle having an annular light emitting slot in one end, a source of light in the handle, and a hollow rod of a translucent material having the property of conducting light in an axial direction by internal reflection secured to the handle with one of its annular ends opposing the light emitting slot, the outer surface of the rod being specular and polygonal in cross section and the inner surface being circular in cross section with a tapered longitudinal raised strip opposite each external side, the inner surface being specular between the strips and the strips having a mat surface and the taper being from the light source end outward.

4. A baton or the like comprising a handle having an annular light emitting slot in one end, a source of light in the handle, a hollow hexagonal rod of a translucent material having the property of conducting light in an axial direction by internal reflection secured to the handle with one of its annular ends opposing the light emitting slot, the material of the rod being raised substantially at each corner, the rod having a circumferential series of circular sockets, one in each external side and partially disposed in the two raised corners bounding the respective side, a translucent reflective disc disposed in each socket, and a raised longitudinal strip on the inner surface of the rod opposite each of the external sides, the strips having a mat surface and the surface between the strips being specular.

5. A baton or the like comprising a handle having an annular light emitting slot in one end, a source of light in the handle, a hollow hexagonal rod of a translucent material having the property of conducting light in an axial direction by internal reflection secured to the handle with one of its annular ends opposing the light emitting slot, the material of the rod being raised substantially at each corner, the rod having a plurality of circumferential series of circular sockets disposed throughout its length, each series consisting of one socket in each of the six sides partially disposed in the two raised corners bounding the respective sides and the sockets of each series being staggered so that three alternate sockets are in one transverse plane and the intervening three are in a transverse plane offset therefrom, a translucent reflective disc disposed in each socket, and a raised longitudinal strip on the inner surface of the rod opposite each of the external sides, the strips having a mat surface and the surface between the strips being specular.

JOHN C. HAGGART, Jr.